May 31, 1927.

H. Y. NORWOOD 1,630,305

TIME CONTROLLED REGULATING APPARATUS

Filed Dec. 9, 1921  4 Sheets-Sheet 1

Fig.1

INVENTOR.
Harry Y. Norwood
BY
his ATTORNEY

May 31, 1927.

H. Y. NORWOOD

1,630,305

TIME CONTROLLED REGULATING APPARATUS

Filed Dec. 9, 1921

INVENTOR.
Harry Y. Norwood
BY
his ATTORNEY

May 31, 1927.
H. Y. NORWOOD
1,630,305
TIME CONTROLLED REGULATING APPARATUS
Filed Dec. 9, 1921
4 Sheets-Sheet 3

INVENTOR:
Harry Y. Norwood
BY
his ATTORNEY

Patented May 31, 1927.

1,630,305

UNITED STATES PATENT OFFICE.

HARRY Y. NORWOOD, OF ROCHESTER, NEW YORK, ASSIGNOR TO TAYLOR INSTRUMENT COMPANIES, OF ROCHESTER, NEW YORK, A CORPORATION OF NEW YORK.

TIME-CONTROLLED REGULATING APPARATUS.

Application filed December 9, 1921. Serial No. 521,222.

This invention relates to apparatus for regulating or controlling temperature or pressure conditions at a specified place or in a container, and more particularly to apparatus of this character for variably controlling conditions so as to produce predetermined changes in a given period of time. One object of the invention is to provide a practical, efficient and convenient apparatus of this variety capable of accurately regulating temperature or pressure conditions in a container, such, for example, as a vulcanizer, so that any desired condition or series of conditions may be produced during a given period of time.

Another object is to provide apparatus of the above description employing temperature or pressure responsive means and timing means operating conjointly to effect the desired regulation, together with mechanism for varying the proportional degree of control effected by one of said means relative to the other, the advantages of which are more fully set forth hereinafter.

Another object is to provide such an apparatus for regulating the temperature in a container of the variety including a drain or condensation chamber or trap, having in conjunction therewith similar apparatus for regulating the intermittent discharge of the condensation trap at temperatures varied in respect to time in accordance with the variation in the main container, thereby affording more accurate control of the latter. To these and other ends the invention resides in certain improvements and combinations of parts all as will hereinafter be more fully described, the novel features being pointed out in the claims at the end of the specification.

In the drawings.

Similar reference numerals throughout the several views indicate the same parts.

Figures 11, 12, 13:
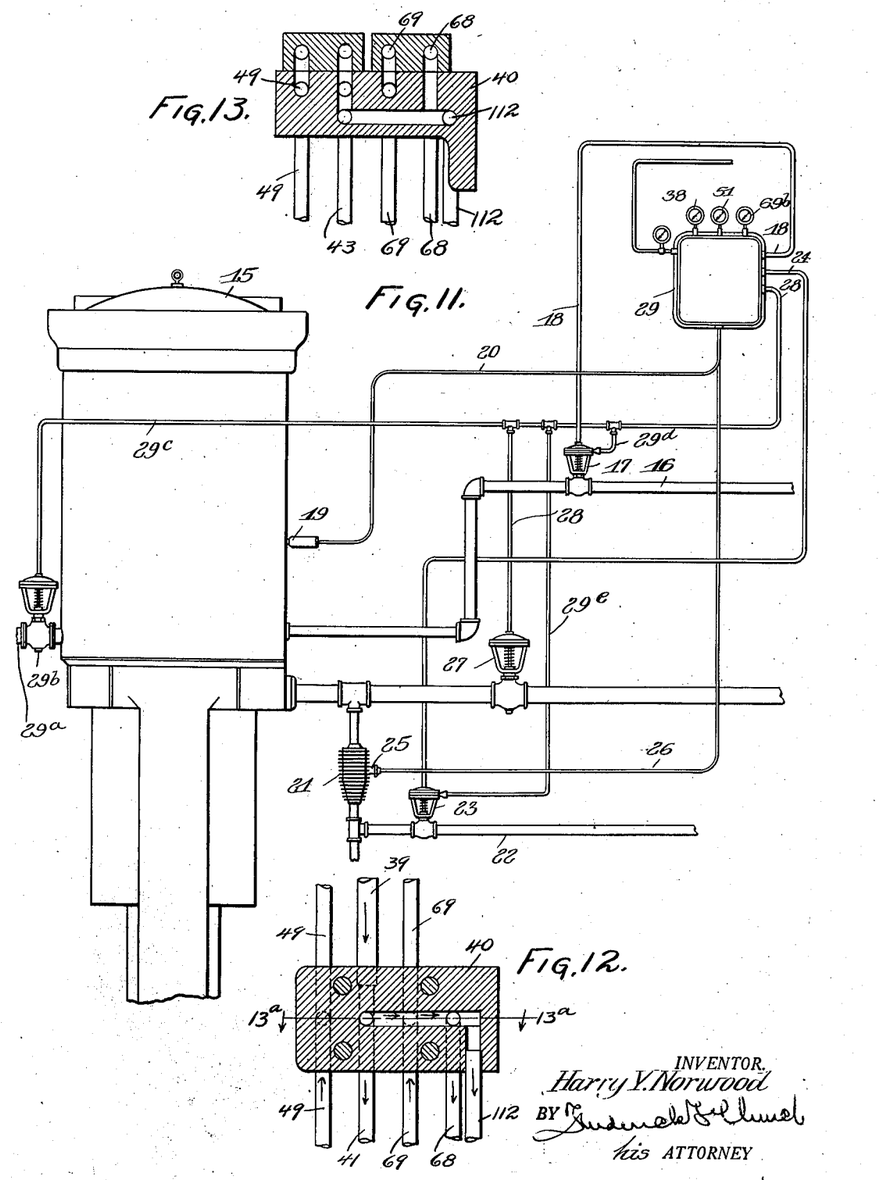
Figure 11 is a diagrammatic view illustrating an application of the apparatus.
Figure 12 is a sectional elevation of a distributing manifold.
Figure 13 is a sectional plan view of the same on the line 13ª—13ª of Figure 12.

The embodiment of the invention selected for the purposes of the present disclosure to illustrate the principles involved and a preferred application of the same, comprises a form of the apparatus particularly adapted for regulating temperature conditions within a closed container, such for example, as a vulcanizer shown generally at 15 in Figure 11. The vulcanizer has as usual an inlet pipe 16 for supplying a heating medium thereto such as steam, the pipe being controlled by a valve 17 of the well known diaphragm type which is actuated in one direction by a spring and in the other by fluid pressure acting upon a diaphragm. The fluid pressure such as compressed air is supplied to the diaphragm chamber of the valve by means of an auxiliary air line 18 leading to the regulating apparatus. Inserted through a wall of the container is the bulb 19 of a capillary thermometer, the tube 20 of which also leads to the regulating apparatus. As commonly found in the art, the vulcanizer has a drain or condensation chamber or trap 21 in which the condensed steam is collected and intermittently discharged through a waste pipe 22 controlled by a diaphragm valve 23, the fluid pressure line 24 of which is shown as leading to the regulating apparatus. A thermometer bulb 25 is also inserted in the condensation trap having its capillary tube 26 extended to the regulating apparatus. In order that the heating process in the vulcanizer may be quickly terminated at the end of the desired period there is also provided an exhaust valve 27 controlling an exhaust line for opening the container to the atmosphere, this valve also being of the diaphragm type controlled by an air line 28 leading to the regulating apparatus which is indicated generally at 29. The termination of a heating period is also expedited by providing a cold water inlet pipe 29ª controlled by a diaphragm valve 29ᵇ and a pressure connection 29ᶜ from the latter to the regulator. The latter is also preferably connected by a pipe 29ᵈ with valve 17 and by a pipe 29ᵉ with valve 23, which latter valves are of the double diaphragm type, so that the steam supply and trap discharge valves are insured of closure when the exhaust valve 27 and the cooling water valve 29ᵇ are opened, as well understood in the art.

Figure 1:
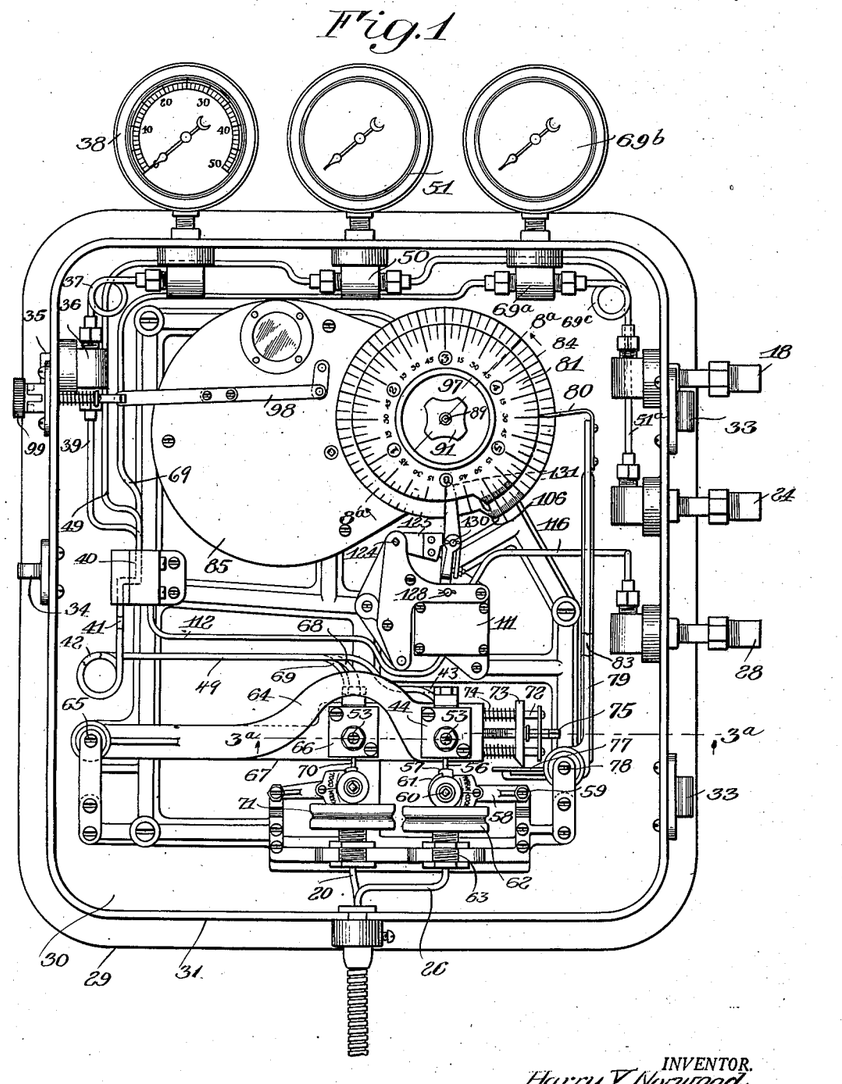
Figure 1 is a front elevation of apparatus embodying the present invention shown in a casing, the cover of which is removed;
Figures 2, 3, 4, 5:
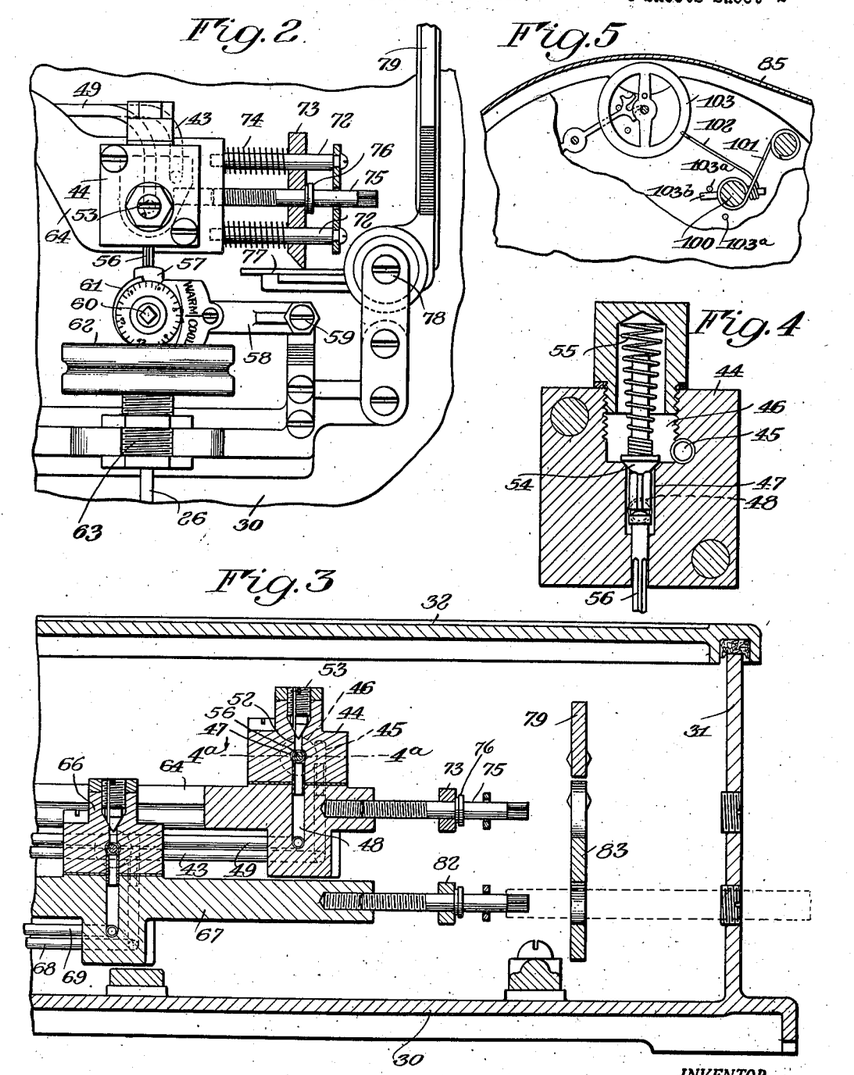
Figure 2 is an enlarged view of parts shown in the lower right hand corner of Figure 1.
Figure 3 is a sectional view on the line 3ª—3ª of Figure 1;
Figure 4 is a sectional view on the line 4ª—4ª of Figure 3.
Figure 5 is a fragmentary detail view of a portion of the timing means.

The regulating apparatus is of a compact self contained character located within a casing comprising a back or base portion 30, Figure 1, on which most of the parts are supported. The casing has walls 31, and its front is closed by a cover 32, (Figure 3) pivotally supported on hinges 33, (Figure 1) to afford convenient access to the operating parts, being fastened in closed position as by means of any suitable locking device, a portion of which is indicated at 34.

The compressed air supply line for actuating the apparatus is connected to a flange 35 of a T coupling 36 carried by the casing wall. Piping 37 leads in one direction from the coupling to a pressure indicator 38 visible on top of the casing and in the other direction, as at 39, to the air distributing manifold 40. From the latter, which may be of any suitable construction, a pipe 41 coiled as at 42 to form a spring leads as at 43 to a secondary valve 44 for controlling the operation of the condensation trap valve. The steam supply valve and the condensation trap valve are both controlled by secondary valves of substantially the same construction, such as the valve 44, which will be described for the sake of convenience as illustrating the construction of both.

Secondary valve 44 comprises a housing or casing of any suitable shape formed with a passageway 45 connecting at one end with the air supply pipe 41 and at the other end with a chamber 46 in the valve casing. The latter has communicating therewith a reduced bore 47 with which communicates a passageway 48 leading at its other end to an air pipe 49 carried around the regulator casing (Figure 1) into connection with a coupling 50 of a pressure indicator 51 visibly supported on top of the casing and from which a pipe 51ª leads to a coupling in the side wall of the regulator casing to which is connected the air line 24 previously described as leading to the condensation trap valve 23. Communicating with the secondary valve chamber 47, on the side thereof opposite the bore 48, is a passage 52 leading to the atmosphere and controlled by a screw plug 53 having a vent slot cut therein so that the size of the vent opening 52 may be regulated by the degree of seating of the plug 53. The end of the bore 47 communicating with chamber 46 is formed with a valve seat cooperating with a valve body 54 having a valve stem supported and actuated by a spring 55 tending to seat the valve. A stem 56 sliding in an opening in the casing is arranged to engage the valve body with its inner end to unseat the same against the action of spring 55, the outer end of the stem projecting exteriorly of the valve casing for engagement with and operation by a temperature responsive element subjected to the temperature within the condensation trap.

The temperature responsive means or elements for the main container and the condensation trap are substantially the same in construction, comprising a lug or abutment 57 for contact with the secondary valve spindle 56 and carried by a short lever 58 moving about a fixed pivot 59 on the casing base 30. Lever 58 rotatably supports a spindle 60 provided with a spiral cam 61 marked with suitable indicia. The cam surface rests upon a capsular diaphragm 62, the stem of which is supported as at 63 in fixed position on the casing. The diaphragm chamber is in communication through its stem with the capillary tube 26 leading to the temperature responsive element in the condensation trap. It is evident from this construction that the temperature responsive element in the trap, through the connections described, operates the valve body of the secondary valve 44. The casing and seat of the valve are movably supported being fixed on the outer end of a lever 64 (Figure 1) pivotally supported as at 65 for movement about a fixed axis. The time control of the secondary valve is effected by timed movement of the valve carrying lever 64, and therefore of the valve seat, as hereafter described, so that the temperature responsive element and the timing means operate conjointly to control the secondary valve.

The secondary valve for controlling the supply of steam to the container proper is, as already stated, of the same construction as the secondary valve 44 already described, being indicated generally at 66 as carried on a lever 67 also pivoted for movement about the axis 65. The air is supplied to valve 66 through flexible piping 68 leading from the air manifold 40 and is conducted from the valve under control of the latter through piping 69 to a coupling 69ª of a pressure indicator 69ᵇ visibly supported on top of the casing. A pipe 69ᶜ leads from manifold 69ª to coupling means carried by the wall of the regulator casing to which is connected the air line 18 leading to the main steam supply valve. Valve 66 has a stem 70 which is controlled by a capsular diaphragm 71 through connections similar to those already described as provided for valve 44. Diaphragm 71 is supported in fixed position on the casing and communicates through capillary tube 20 with the thermometer bulb 19 in the container proper. The supply of steam to the container is thus controlled by the action of the temperature responsive means in the latter on the secondary valve 66, the operation of which is also conjointly controlled by the timing means which swings lever 67 about its pivot as described in connection with lever 64, and as explained in detail below.

The connections with the timing means for swinging levers 64 and 67 are substantially the same so that a description of one will suffice for both. Thus the outer end of lever 64 has fixed therein a pair of spaced parallel posts 72 (Figure 2), supporting and guiding a cross bar 73 which slides on the posts and is urged outwardly on the latter away from the lever as by means of springs 74. A threaded spindle 75 is engaged with a threaded opening in the end of the lever between posts 72 and has a shoulder 76 engaging cross bar 73 through an opening in which the spindle 75 is rotatably extended. The outer end of the spindle is squared for engagement with a suitable key which may be inserted through an opening in the casing wall, and it is apparent that by turning the spindle one way or the other cross bar 73, which is in effect an extension of lever 64, may be moved toward or from the pivot of the lever for increasing the effect length of the latter. The lower end of the cross bar is formed with a knife edge and bears upon one arm 77 of a lever pivoted at 78 on the regulator casing. The other arm 79 of this lever extends upwardly and carries at its end a finger 80 engaging with a cam or templet 81 rotated by a time train presently to be described.

Lever 67 also carries a similar adjustable cross bar or extension 82 (Figure 3) bearing upon one arm of a lever 83 which like the lever 79 has its other arm positioned for engagement with a cam or templet 84 rotated by the time train. It is evident that as levers 79 and 83 are swung about their pivots by the time cams or templets, they serve to move in turn the corresponding levers 64 and 67 which, of course, move the valve seats relative to the valve bodies themselves and thus open or close the valves, as the case may be, in conjoint operation with the temperature responsive elements which move the valve bodies by the means described. The adjustable bars or extensions 73 and 82 of the levers 64 and 67 respectively serve to adjust the point of contact between the levers of each pair toward or from the points of pivotal support, thereby varying the degree of motion transmitted from the timing means to the secondary valve seats. By this means the proportional movement of the secondary valve seats by the timing means relative to the movement of the valve bodies by the temperature responsive elements may be varied at will, as is useful in varying the extent of operation of a secondary valve by a given portion of a cam or templet, or in other words, in varying the range of temperature change which may be varied by a given templet or portion thereof. Also this adjustable means is useful where the capsular diaphragm or the timing templet is changed. Thus it is necessary at times to replace a capsular diaphragm by a new one having a different degree of movement for the same temperature range. This would ordinarily require the provision of a new templet coordinated with the new diaphragm or some other equally troublesome and expensive correction. The present invention however overcomes this difficulty by the simple adjustment described by means of which a diaphragm and templet may be coordinated to produce the desired conjoint effect.

The timing means comprises a time train or clock of any usual or suitable variety enclosed in a casing indicated at 85 (Figure 1) on which is supported a stationary post 86 (Figure 8) rotatably carrying a hollow, sleeve-like spindle 87. The latter has fixed thereon a gear 88 driven by the time train and is provided with a threaded and squared extension 89 which may be turned by a key for winding up the clock. Spindle 87 is formed with a seat 90 on which rests a sleeve 90ª which may be locked to the spindle as by means of a nut 91 engaging the threaded extension 89 of the spindle. Sleeve 90ª is formed adjacent the lower end with a shoulder 92 on which is seated the templet or cam 84 which has a central opening passing over the sleeve. Resting on the upper side of the cam is a collar 93 having a seat 94 on which is carried a trip member 95, the function of which is described hereafter. Resting on the annular surface of member 95 is a spacer 96 on which in turn rests the templet or cam 81. A nut 97 threadedly engaging the upper end of the sleeve is adapted to releasably clamp the cams 81 and 84 and the trip 95 together on the sleeve, so that they may be released for individual adjustment relative to the spindle and then reclamped in adjusted position. Similarly, with the cams and trip clamped to the sleeve, the latter may be released for adjustment with the supported parts as a whole relative to the spindle and then reclamped in adjusted position. This construction provides a compact self contained means for operating the various parts of the apparatus so constructed and arranged as to provide for complete and convenient adjustment of the timing elements.

Means are provided for starting and stopping the time train comprising a link 98 (Figure 1) operated by means of a finger piece 99 on the outside of the casing and having a crank connection with a spindle 100 (Figure 5) rotatably supported in the casing of the clock. The spindle is normally urged in one direction by a coil spring 101 and carries a resilient finger 102 positioned for contact with the balance wheel 103 on the clock. Stops 103ª on the casing engage a pin 103ᵇ carried by spindle 100 and limit movement of the latter. By movement of finger piece 99 in one direction, finger 102 may be brought into engagement with the balance wheel to stop the latter, whereas movement of the finger piece in the opposite direction moves the finger 102 out of engagement with the balance wheel and at the same time gives to the latter a starting impetus.

The cams or templets driven by the time train may, of course, have any contour for representing any desired range of temperature changes. Thus cams 81 and 84 which are similar in shape have in the present instance a generally spiral contour representing a gradual rise in temperature over a period of time. At 104 is a low portion of the cams adapted to be brought by initial rotary adjustment into contact with the ends of the respective cooperating levers and representing the starting position. As the cams are rotated in counterclocking direction, the increasing radius of the contour of each moves the corresponding lever, representing the increasing admission of steam to the container. The cams are graduated with time indicia beginning adjacent the starting position and continuing around the periphery of the cam which is marked in the present instance for a time period of approximately, six hours. Adjacent the end of the period is a depression 106 representing the shutting off of the steam supply. The cams may, of course, have any other desired shape, as for example, one for producing both increases and decreases of temperature in the container in a given period of time.

Figures 6, 7, 8, 9, 10:
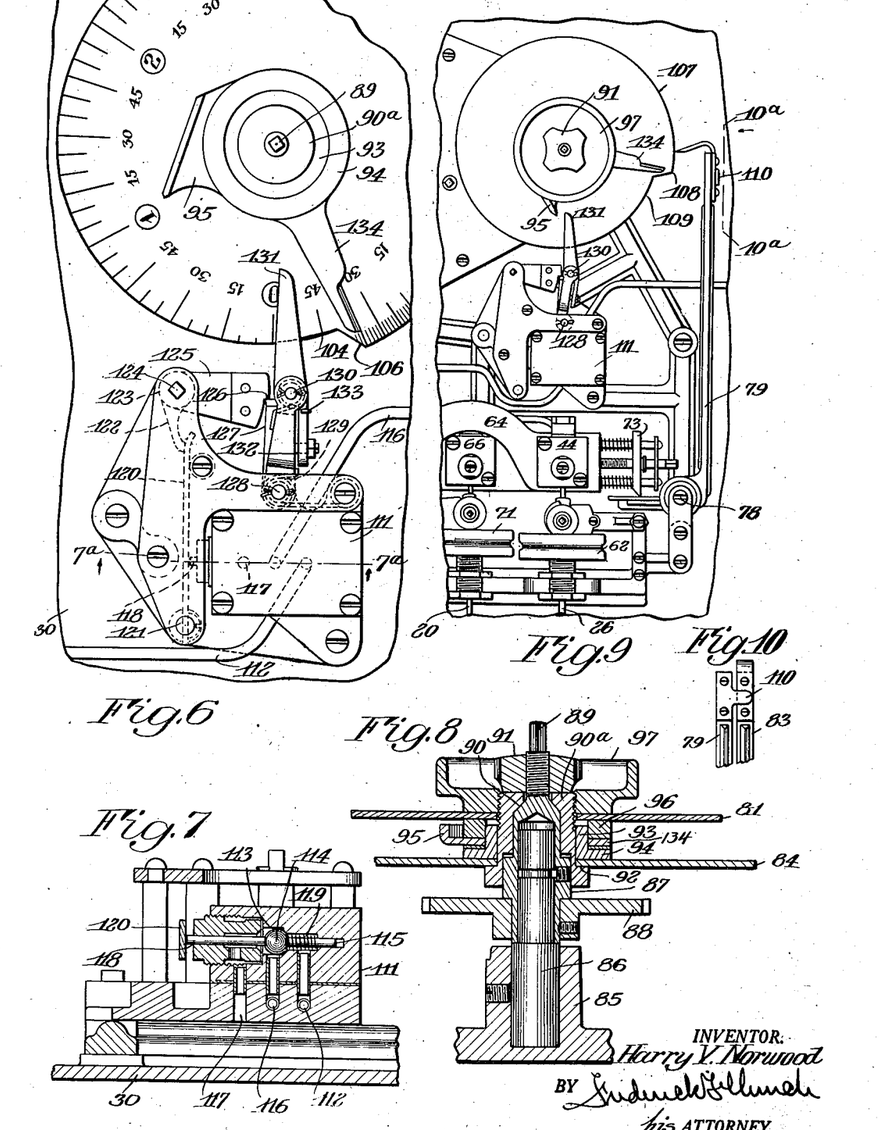
Figure 6 is an enlarged elevation of parts shown adjacent the center of Figure 1;
Figure 7 is a sectional view on the line 7ª—7ª of Figure 6.
Figure 8 is a sectional view on the line 8ª—8ª of Figure 1.
Figure 9 is a view of some of the parts shown in Figure 1 in modified form.
Figure 10 is a fragmentary detail view substantially on the line 10ª—10ª of Figure 9.

In Figures 9 and 10 there is shown a modified form of construction in which instead of the pair of cams 81 and 84 for the container and its trap, there is substituted a single cam 107 with which the lever 83 cooperates as already described. The other lever 79 for the condensation trap however, instead of being provided with the finger piece 80, carries a lug 110 engaging the adjacent lever 83 so that both levers are operated in conjunction by the same cam and the time control of the condensation trap follows exactly the time control of the container proper.

The combined time and temperature control of the condensation trap is advantageous in that it provides for intermittent discharge of the condensation as the latter collects at temperatures slightly below and closely following those of the container itself so that there is little loss of heat to the condensation in the trap and the control of the container temperature is thereby made more accurate.

It is desirable in the control of the container to immediately reduce the pressure and temperature at the end of the process period for terminating the latter quickly and accurately, to which end there is provided in conjunction with the above apparatus a secondary valve indicated generally at 111 (Figures 1, 6 and 7). Air is supplied to the valve by a pipe 112 connected with the air manifold 40 and communicating with one end of an irregular, centrally enlarged valve chamber 113. The ends of the enlarged central portion of the chamber are provided with valve seats with which cooperates a ball valve 114 movable in the chamber enlargement and having a stem 115 sliding in openings in the casing for supporting and guiding the valve in its movement from one seat to the other. At 116 is a pipe communicating at one end with a coupling on the regulator casing wall with which is connected the pipe 28 leading to exhaust valve 27 previously described. The other end of pipe 116 communicates through a passage in the casing of valve 111 with the central enlargement of the valve chamber 113. At 117 is a passage in the casing communicating with the other end of the valve chamber, from which it is apparent that, with the valve body 114 in the position shown in Figure 7, the air supply is cut off and the main or diaphragm valve is connected with the atmosphere so that the valve is closed by its spring. Valve body 114, however, has one end of its stem projecting exteriorly of the casing as at 118, the other end of the stem carrying a spring 119 tending to move the valve to its opposite position and to move the stem 118 out of the casing. Stem 118 is thus arranged for engagement by a resilient member or leaf spring 120 having one end fixed in a stationary post 121 and its opposite end carried beyond the valve stem 118 for engagement by a projection 122 on a sleeve 123 pivotally supported on a stationary post 124. The sleeve carries also an arm 125 having a shoulder 126 for engagement with the outer end of a catch arm 127 pivotally supported as at 128 and urged by spring 129 toward the part 125. Pivotally supported on the latch as at 130 is a part 131 having a tail 132 for engagement with the latch. A spring 133 tends to move the tail or part 131 toward the latch from which construction it is apparent that part 131 has an idle movement in one direction on pivot 130 but is adapted when moved in the opposite direction to swing latch 127 and release arm 125, thereby permitting leaf spring 120 to fly outwardly and release the valve stem 118. Spring 119 of the valve then moves the latter to its opposite position thereby connecting the air supply pipe 112 with the pipe 116 leading to the diaphragm exhaust valve to open the latter. Such movement of part 131 and latch 127 to open the exhaust valve is effected by the trip 95 previously described as rotated by the time spindle. Trip 95 is provided with an index 134 cooperating with the time indicia on cam 84. By this means when the cam is set in initial position with its zero mark under the cooperating lever as 83, index 134 may be set to the time at which it is desired to terminate the process and trip 95 is thereby positioned for engagement with the latch to open the exhaust valve at the proper time.

In operation with the various parts connected as described and with a supply of steam and air provided, the time train is wound up and the cams and trip set as described for starting the process and for terminating the same at the end of the desired period. Finger piece 99 is then operated as already described to start the time train. Initially the low portions of cams 81 and 84 engage levers 79 and 83 which in turn so position levers 64 and 67 as to lower the casings of the secondary valves of the trap discharge and container inlet, respectively. The container and trap being cold, their diaphragms 62 and 71 are collapsed, valves 44 and 66 remain seated to shut off the air and steam therefore is admitted to the container while the trap discharge valve is opened. When the container is heated to a predetermined temperature its expanding diaphragm 71 tends to unseat its valve 66 and shut off the steam. Cam 84, however, through levers 83 and 67, eventually raises the casing of valve 66 so that steam is throttled only at increasing expansion of the diaphragm corresponding to increased temperatures in the container. When the trap becomes heated, the expanding diaphragm 62 unseats valve 44 to transmit air pressure and close the discharge valve 23. When the trap is cooled by the collection of condensation, however, a reverse action occurs and its discharge valve is opened, but at increasing temperature brought about by the described action of cam 81 and connecting levers, corresponding to the increasing container temperature. In this manner any desired temperature variations may be automatically produced during a given period and the trap is intermittently discharged as condensation collects, and in a sensitive manner at temperatures following closely those of the main container. At the end of the predetermined period the described automatic release of valve 111 applies air pressure to and closes the steam supply and trap discharge valves 17 and 23. The same actuation of valve 111 applies air pressure to and opens the exhaust valve 27 to instantly reduce the pressure and temperature in the container, and simultaneously opens valve 29$^b$ to admit cooling fluid, to quickly terminate the process, it being understood that valves 17 and 23 have their valve bodies (not shown) arranged on the opposite side of the valve seat as compared with valves 27 and 29$^b$ so that the latter are opened by air pressure as well understood in the art.

As apparent from the drawings, the construction is self contained and compact and readily accessible for making the various convenient adjustments described. The apparatus is fully automatic and in case it becomes necessary to replace the time cam or the corresponding temperature diaphragm, adjustment may be made by means of the spindle 75 to correct for any variation of the new part from the old, or in other words to coordinate the parts to produce the desired timed temperature variation. The same adjustment also makes it possible to vary the temperature changes which may be produced by a given templet.

I claim as my invention:

1. In a regulating apparatus, the combination of a container the condition within which is to be regulated and a regulating valve therefor, actuating means for said valve, a timing device, a temperature responsive device, mechanism comprising a lever arranged for movement by one of said devices for variable cooperation with the other device to effect conjoint control by said devices of said actuating means, and adjustable means for differentially varying the effective length of said lever for varying the proportional effect of one of said devices relative to the other on said actuating means.

2. In a regulating apparatus, the combination of a container the condition within which is to be regulated and a regulating valve therefor, actuating means for said valve, a timing device, a temperature responsive device, mechanism comprising a pivoted lever arranged for movement by one of said devices and a member engaging the lever and in variable cooperation with the other of said devices to effect conjoint control by the latter of said actuating means, and means for adjusting the point of engagement between said member and lever toward and from the pivot of the latter for varying the proportional effect of one of said devices relative to the other on said actuating means.

3. In a regulating apparatus, the combination of a container the condition within which is to be regulated and a regulating valve therefor, actuating means for said valve, a timing device, a temperature responsive device, a pivoted lever arranged for movement by one of said devices, mechanism in supporting engagement with said lever for moving the other of said devices and said actuating means relatively toward and from each other to operate the latter, and means for adjusting the point of engagement between said mechanism and lever toward and from the pivot of the latter to vary said relative movement of the actuating means and device.

4. In a regulating apparatus, the combination of a container the condition within which is to be regulated and a regulating valve therefor, actuating means for said valve, a timing device, a temperature responsive device, a pivoted lever arranged for movement by one of said devices, a second pivoted lever in engagement with the first and provided with means for moving the other of said devices and said actuating means relatively toward and from each other to operate the latter, and means for adjusting the point of engagement of said levers relative to the pivot of one of the latter to vary the degree of movement of said second lever.

5. In a regulating apparatus, the combination of a container the condition within which is to be regulated and a regulating valve therefor, fluid pressure means including a secondary valve for actuating said regulating valve, timing mechanism provided with templet means formed in contour to represent a desired temperature range, a temperature responsive element subjected to the temperature in said container, a pivoted lever engaging said templet means, a second pivoted lever engaging the first and provided with means for effecting relative movement between said temperature responsive element and secondary valve to operate the latter, and adjustable means for varying the point of contact between said levers relative to the pivot of one of the latter to vary said relative movement of the secondary valve and element.

6. In a regulating apparatus, the combination of a container the condition within which is to be regulated and a regulating valve therefor, fluid pressure means including a secondary valve for actuating said regulating valve, timing mechanism provided with templet means formed in contour to represent a desired temperature range, a temperature responsive element subjected to the temperature in said container, a pivoted lever engaging said templet means, a second pivoted lever engaging the first and carrying said secondary valve, in position for engagement and operation by said temperature responsive element and adjustable means for varying the point of contact between said levers relative to the pivot of one of the latter for varying the relative movement of the secondary valve and element.

7. In a regulating apparatus, the combination of a container the condition within which is to be regulated and a regulating valve therefor, fluid pressure means including a secondary valve for actuating said regulating valve, timing mechanism provided with templet means formed in contour to represent a desired temperature range, a temperature responsive element subjected to the temperature in said container, a pivoted lever engaging said templet means, a second pivoted lever engaging the first and carrying said secondary valve in position for engagement and operation by said temperature responsive element, resilient piping connections for said secondary valve arranged to urge said second lever toward the first and toward said temperature responsive element, and means for adjusting the point of contact between said levers toward and from the pivot of one of them to vary the extent of movement of said secondary valve.

8. In a regulating apparatus, the combination of a container the condition within which is to be regulated, a regulating valve therefor, a condensation trap for said container, a discharge valve for said trap, fluid pressure systems for actuating said valves, temperature responsive elements subjected to the temperatures in said container and trap, a time train, a spindle driven by said train, a pair of cams on said spindle provided with means for locking and releasing them relative to each other and for clamping and unclamping them relative to said spindle while locked relative to each other, a pivoted lever engaging each cam, a second pivoted lever engaging each of said first levers, a secondary valve for controlling each of said pressure systems carried by each of said secondary levers in position for engagement and operation by said temperature responsive elements, respectively, and means for adjusting the degree of movement transmitted by said levers to said secondary valves.

9. In a regulating apparatus, the combination of a container the condition within which is to be regulated, a fluid supply line therefor provided with a valve, a discharge valve for the container, a condensation trap for said container having a discharge valve, fluid pressure systems including secondary valves for actuating said supply and discharge valves, temperature responsive elements subjected to the temperatures in said container and trap, a time train, a spindle driven by the latter, cam means adjustably carried by said spindle and bearing time indicia, a trip adjustable on said spindle and having an index cooperating with the indicia on said cam means, mechanism cooperating with said cam means and temperature responsive elements of the container and trap for controlling the corresponding secondary valves to regulate the container and intermittently discharge said trap at temperatures varied with respect to time by said cam means and mechanism cooperating with said trip and the secondary valve of said container discharge valve to open the latter at a predetermined time.

10. In a regulating apparatus, the combination of a plurality of valves to be regulated, actuating means for said valves, a time train, a part rotated thereby, a sleeve rotatably adjustable on said part, means for locking said sleeve and part together, a plurality of cams rotatably adjustable on said sleeve, means for clamping said cams to said sleeve, and actuating connections between said cams and valve actuating means.

11. In a regulating apparatus, the combination of a container the condition within which is to be regulated, a regulating valve therefor, fluid pressure means for actuating said valve including a secondary valve, resilient means for operating said secondary valve tending normally to move to one position, a member for holding said resilient means in another position, a latch for said member, a time train, and an adjustable trip rotated thereby for moving the latch at a predetermined time to operate said secondary and regulating valves.

12. In a regulating apparatus, the combination of a container the condition within which is to be regulated, a regulating valve therefor, fluid pressure means for actuating said valve including a secondary valve, a leaf spring for operating said secondary valve, a pivoted member for engagement with said spring to tension and hold the same in one position, a pivoted latch for said member having a part movable in one direction to move the latch and movable idly in the other direction, a time train, a trip rotated by said train and means including a dial for selectively setting said trip relative to said train for operating said latch part at a predetermined time.

HARRY Y. NORWOOD.